March 10, 1964 W. M. WAKELEY 3,124,093
WELD TORCH MECHANISM

Filed June 2, 1960  4 Sheets-Sheet 1

INVENTOR.
William M. Wakeley
BY
Attorney

March 10, 1964  W. M. WAKELEY  3,124,093
WELD TORCH MECHANISM
Filed June 2, 1960  4 Sheets-Sheet 3

INVENTOR.
William M. Wakeley
BY
Attorney

March 10, 1964 W. M. WAKELEY 3,124,093
WELD TORCH MECHANISM

Filed June 2, 1960 4 Sheets-Sheet 4

INVENTOR.
William M. Wakeley
BY
Attorney

United States Patent Office 3,124,093
Patented Mar. 10, 1964

3,124,093
WELD TORCH MECHANISM
William M. Wakeley, Milwaukee, Wis., assignor to Acro Welder Mfg. Co., Milwaukee, Wis., a corporation of Wisconsin
Filed June 2, 1960, Ser. No. 33,549
13 Claims. (Cl. 113—124)

This invention relates to a cutting or welding mechanism and particularly to an apparatus for maintaining a constant relationship between the torch and the workpiece throughout the cut or weld.

Welding or cutting requires very accurate control of the torch in order to produce satisfactory results. In linear type welds or cuts, the distance of the torch from the work and the relative speed of the torch with respect to the work can be easily regulated to obtain an even weld. Flame intensity has also been fairly accurately controlled by photo-electric cells or flame sensors, but these both require complicated and costly electric systems. Cutting or welding a contoured surface presents a different problem, since the angle of the torch with respect to the work tends to change constantly.

The primary object of this invention is to provide a device for producing an even weld or cut on a contoured surface.

Another object of the present invention is to provide a welding or cutting device for automatically maintaining a constant angle between the torch and the work.

This is accomplished by transferring the motions of a magnet with respect to a template to a torch so the torch welds along the same contour as followed by the magnet around the template.

Since the magnet, if properly balanced, will always remain perpendicular to the surface of the template, the torch is mounted to follow the motion of the magnet. By maintaining the distance and relative speed between the torch and work constant with conventional devices and combining them with the present improved welding device, a weld or cut can be produced which is even throughout its full length.

Other objects and advantages will be pointed out in, or be apparent from, the specification and claims, as will obvious modifications of the single embodiment shown in the drawings, in which:

Figure 1:
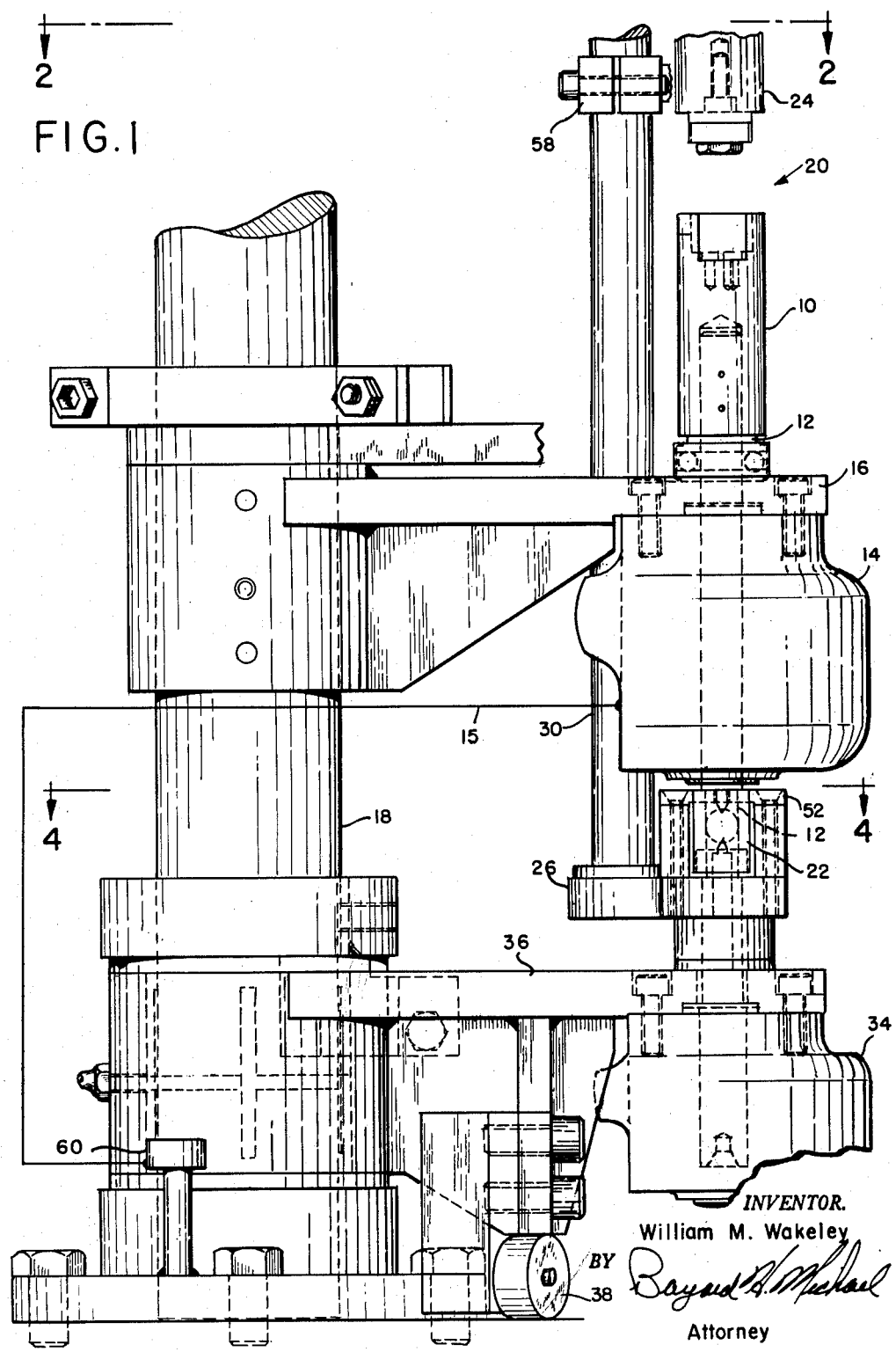
FIG. 1 is a side elevation of the automatic adjusting apparatus in a welding device.
Figure 2:
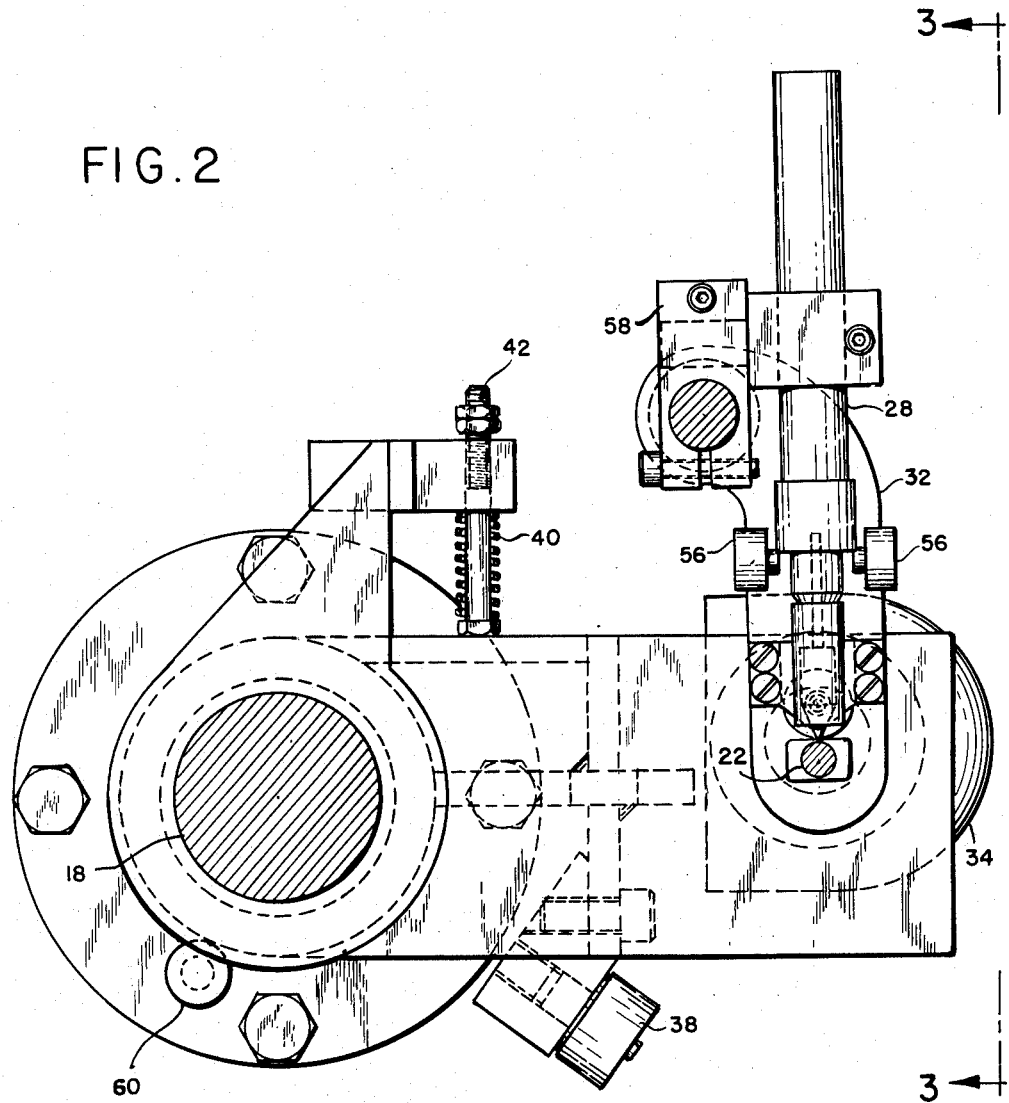
FIG. 2 is a top view of the welding device showing the relation of the torch to the magnet.
Figure 3:
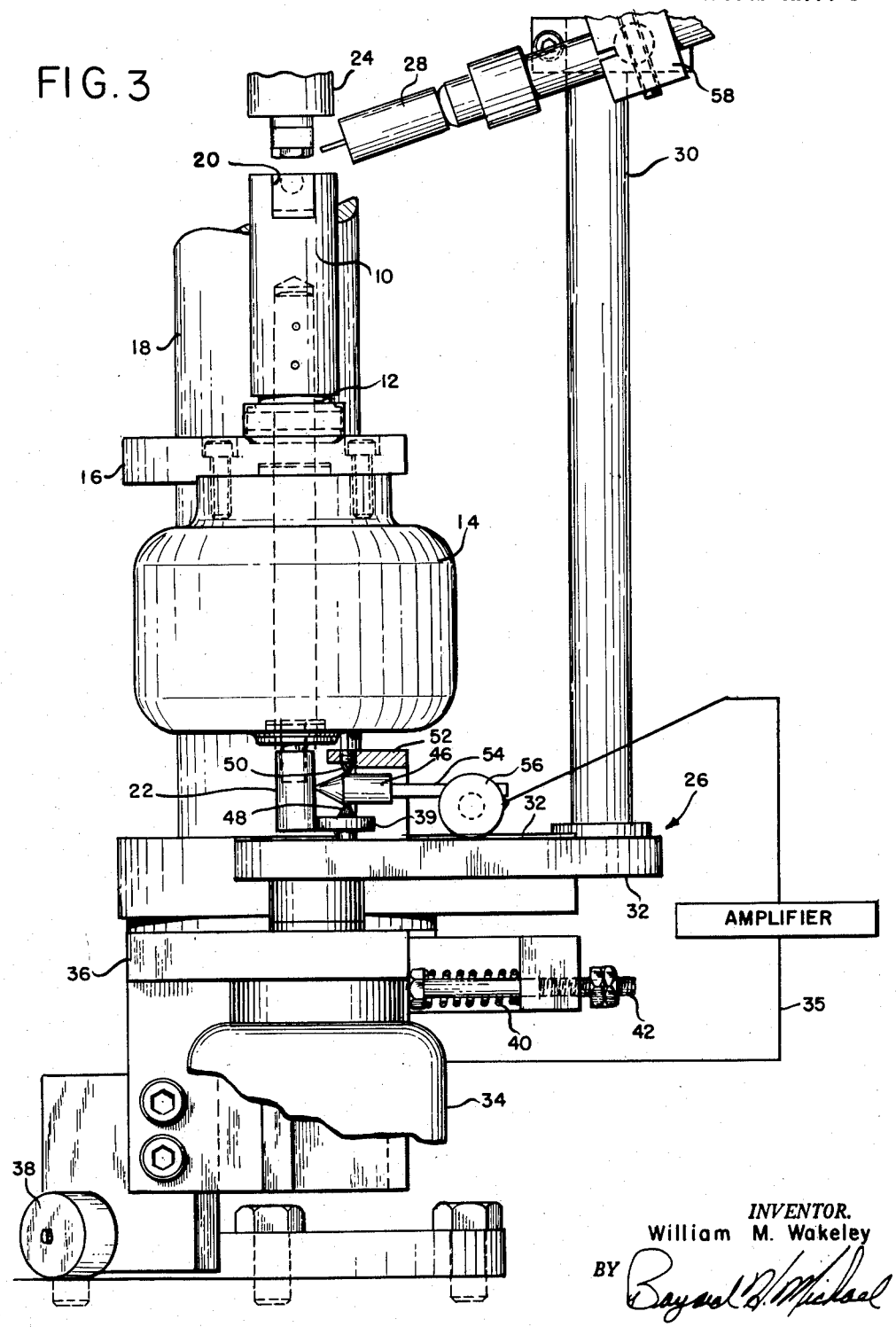
FIG. 3 is taken on line 3—3 of FIG. 2 showing a side elevation of the magnet and torch.
Figure 4:
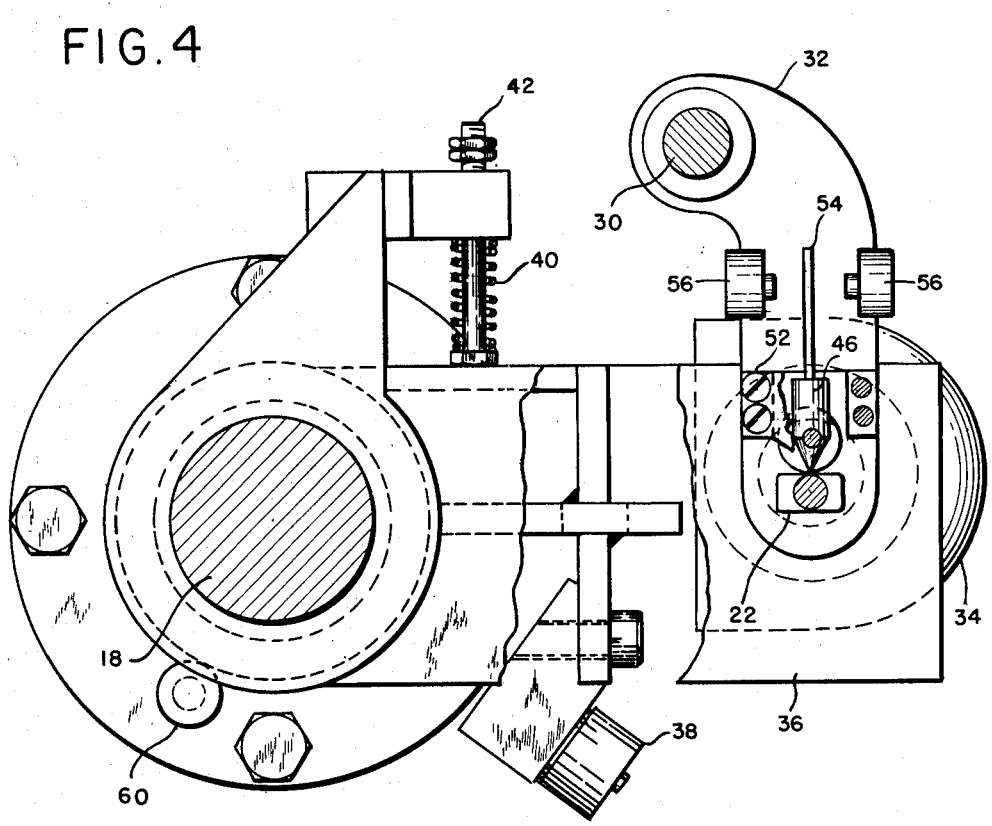
FIG. 4 shows the magnet in relation to the template.

As seen in the drawings, workpiece holder 10 is secured to the upper end of drive shaft 12 of motor 14 which is secured to bracket 16 on stationary post 18. The article or workpiece (not shown) to be welded or cut is mounted in blind hole 20 in the holder and template 22 is secured to the lower end of shaft 12 so that the workpiece and template are rotated at the same rotational speed. The workpiece is held in position by a conventional rotating member 24 (partly shown in FIGS. 1 and 3). The contour of the template is followed by a novel magnetically controlled bracket 26 which is used to maintain the relative speed, distance and angle of torch 28 constant with respect to the workpiece.

The torch is clamped to shaft 30 on link 32 with the link secured to the drive shaft of torch motor 34 so that the torch can be rotated about the axis of the torch motor. The torch motor is secured to bracket 36 which is rotatable on rollers 38 about stationary post 18. Guide roller 39 is pivoted on link 32 and biased by spring 40 acting through bolt 42 against bracket 36 to engage the peripheral surface of the template. The roller is mounted so that the line of contact between the roller and template lies generally on the axis of the torch motor. The roller will follow the contour of the template as it is rotated due to the bias of spring 40 and the torch will follow the movement of the guide roller to thereby maintain a constant distance between the workpiece and the torch.

The angle of the torch with respect to the workpiece is controlled by magnet 46 balanced between pivot 48 of the roller 39 and pivot 50 depending from bracket 52 on link 32. The point of the magnet projects outward from the pivot the same distance as the periphery of the roller so that it is adjacent the vertical line of contact between the roller and the template. The magnet will always rotate to a position perpendicular to a tangent drawn through the point on the template immediately adjacent the point of the magnet. The magnet is provided with a blade 54 which projects back from the template between a pair of coil detectors 56 electrically connected by wires 35 through an amplifier (not shown) to torch motor 34. The detection system is of the conventional type responding to a change in position of the blade which results in a change in impedance between the coils. If the magnet rotates due to a change in the contour of the template, the blade will move closer to one of the detectors causing the detectors to actuate motor 34 to rotate link 32 so it always is aligned with the blade and the blade is spaced equidistant from the detectors. It can be seen that the torch will also rotate with link 32 so that it is always maintained at the same relative position with respect to the magnet and therefore the same predetermined angle with respect to the point on the work being welded or cut. The vertical angle of the torch is manually set at the start of an operation by adjusting clamps 58.

The rotational speed of the workpiece is varied to maintain a constant relative speed between the work and the torch to compensate for variations in the radial distance from the axis of rotation of the template to the line contact of the roller on its periphery. This is accomplished by mounting potentiometer 60 on post 18 to detect motions of bracket 36 as it pivots about post 18 in response to changes in the contour of the template. The potentiometer is electrically connected by wires 15 to motor 14 to slow down the rotational speed of the workpiece as roller 39 moves the bracket away from the axis of rotation and speeds it up as it moves toward the axis of rotation.

In operation, a workpiece is positioned in the holder and the desired template secured to the shaft of motor 14. The torch is set to the desired vertical angle by adjusting clamps 58. Bracket 36 is allowed to rotate about post 18 until the guide roller 39 engages the periphery of the template. The magnet will automatically come to rest perpendicular to the surface of the template and if blade 54 is not centered between the coil detectors 56, torch motor 34 will rotate the link until the blade is equidistant from each coil. The torch is positioned on shaft 30 with its axis lying in a plane equidistant from the coil detectors and will therefore always automatically assume the same position as the axis of the magnet. It should be obvious that the torch can be preset at any angle with respect to the magnet and will remain in that same relation with the magnet throughout an operation of the mechanism. Upon rotation of the workpiece, the guide roller will follow the periphery of the template with each change in radial distance from the axis of the template being sensed by the potentiometer varying the speed of drive motor 14 to maintain a constant rate of speed between the surface of the workpiece and the torch.

Although but a single embodiment of the present invention has been illustrated and described, it will be apparent to those skilled in the art that various changes and modifications may be made therein without departing from the spirit of the invention or from the scope of the appended claims.

I claim:

1. In combination, a work holder, a work device, means supporting said work device adjacent said work holder and operative to provide relative movement therebetween, a template of magnetic material, magnetic means having a magnetic axis, means mounting said magnetic means adjacent said template and operative to provide relative movement therebetween corresponding to the relative movement between said work holder and work device, means supporting said magnetic means for independent movement relative to said template so that said magnetic means is movable to assume a position wherein said magnetic axis is generally perpendicular to the portion of the surface of said template nearest said magnetic means and to maintain said perpendicular relationship during said relative movement between said template and said magnetic means, means for detecting movement of said magnetic means to maintain said perpendicular relationship, and means controlled by said detecting means and operative, in accordance with movement of said magnetic means to maintain said perpendicular relationship, to move said work device to a position relative to said work holder corresponding to the relative position between said template and said magnetic means.

2. In combination, a movable work holder, means for moving said work holder, a work device, means supporting said work device adjacent and for movement relative to said work holder, a template of magnetic material connected to and movable with said work holder, magnetic means having a magnetic axis, and means supporting said magnetic means adjacent said template for movement relative thereto to assume a position wherein said magnetic axis is generally perpendicular to the portion of the surface of said template nearest said magnetic means and to maintain said perpendicular relationship during movement of said template, means for detecting movement of said magnetic means to maintain said perpendicular relationship, and means controlled by said detecting means and operative, in accordance with movement of said magnetic means to maintain said perpendicular relationship, to move said work device to a position relative to said work holder corresponding to the relative position between said template and said magnetic means.

3. In combination, a rotatable work holder, means for rotating said work holder, a torch supported adjacent said work holder for movement relative thereto, a ferromagnetic template connected to and rotatable with said work holder, magnetic means having a magnetic axis, means supporting said magnetic means adjacent said template for independent movement relative thereto so that said magnetic means is movable to assume a position wherein said magnetic axis is perpendicular to a tangent to the surface of the template nearest to said magnetic means and to maintain said perpendicular relationship as said template moves relative thereto, means for detecting movement of said magnetic means to maintain said perpendicular relationship, and means controlled by said detecting means and operative, in accordance with movement of said magnetic means to maintain said perpendicular relationship, to move said torch to a position relative to said work holder corresponding to the relative position between said template and said magnetic means.

4. In combination, a movable work holder, means for moving said work holder, a work device supported adjacent said work holder for movement relative thereto, a ferromagnetic template connected to and movable with said work holder, follower means in engagement with and movable relative to said template in a direction transversely of the direction of movement of said template, said work device connected to said follower means for movement in a direction transversely of the direction of movement of said work holder and in accordance with said transverse movement of said follower means, said follower means including a magnetic member, a magnetic axis and means supporting said magnetic member adjacent said template for independent movement relative to said template to assume a position wherein said magnetic axis is perpendicular to a tangent to the surface of said template nearest to the magnetic member and to maintain said perpendicular relationship as said template moves, means for detecting movement of said magnetic means to maintain said perpendicular relationship and means controlled by said detecting means and operative, in accordance with movement of said magnetic means to maintain said perpendicular relationship to move said work device to a position relative to said work holder corresponding to the relative position between said template and said magnetic means.

5. In combination, a rotatable work holder, means for rotating said work holder, a torch supported adjacent said work holder for movement relative thereto, a ferromagnetic template connected to said work holder for rotation therewith about a common axis, a follower in engagement with and movable radially relative to said template, means connecting said follower to said torch so that said torch moves radially relative to said work holder in accordance with radial movement of said follower relative to said template, a magnetic member having a magnetic axis and pivotally supported adjacent said template for movement relative thereto so that said magnetic member is movable to assume a position wherein said magnetic axis is perpendicular to a tangent to the surface of said template nearest to said magnetic member and to maintain said perpendicular relationship as said template moves relative to said magnetic member, detecting means associated with said magnetic member and operative to detect movement of said magnetic member to maintain said perpendicular relationship, and means connected to and controlled by said detecting means for moving said torch relative to said work holder, in accordance with movement of said magnetic member to maintain said perpendicular relationship, to move said torch to a position relative to said work holder corresponding to the relative position between said magnetic member and said template.

6. In combination, a rotatable work holder, means for rotating said work holder, a torch supported adjacent said work holder for movement relative thereto, a ferromagnetic template connected to said work holder for rotation therewith about a common axis, a follower member in engagement with and movable radially of said template, a generally elongated magnetic member having an elongated magnetic axis and pivotally supported from and movable with said follower member and maintained in proximity to but in spaced relationship from said template by said follower, means connecting said follower member to said torch so that said torch is movable in response to radial movement of said follower with respect to said template to maintain a constant predetermined distance between said torch and said work holder, said magnetic member being movable to assume a position wherein said magnetic axis is perpendicular to a tangent to the surface of said template nearest said magnetic member and being movable upon rotation of said template to maintain said perpendicular relationship, detecting means associated with said magnetic member and operative to detect movement of said magnetic member to maintain said perpendicular relationship, and means connected to and controlled by said detecting means and operative to move said torch relative to said work holder, in accordance with movement of said magnetic member to maintain said perpendicular relationship, to assume a position relative to said work holder corresponding to the position of said magnetic member relative to said template.

7. The combination of claim 6 including means for rotating said template and said work holder, and means sensing said radial movement of the follower and operative in response thereto to control the speed of said last mentioned means so that the speed movement of said work holder relative to said work device remains constant.

8. Apparatus for achieving an automatic welding operation, or the like, comprising, in combination, a rotatable work holder, means for rotating said work holder, a ferromagnetic template connected to said work holder for rotation therewith about a common axis, first link means pivotally supported for rotation about a second axis, a follower supported on said first link means for engagement with and movement radially of said template, a generally elongated magnetic member having a magnetic axis and pivotally supported on said first link means adjacent said template and for movement jointly with and independently of said follower relative to said template, said magnetic member being movable to a position wherein its magnetic axis is perpendicular to a tangent to the surface of the template nearest to the magnetic member, means fixedly supported on said first link means for detecting movement of said magnetic member relative to said link to maintain said perpendicular relationship, a motor connected to and operative to drive said first link means about said second axis and controlled by said detecting means so that said first link means is driven to return said magnetic member and said first link means to a normal relative position when said magnetic member deviates from said normal position to maintain said perpendicular relationship during movement of said template, and a torch positioned adjacent said work holder and connected to said first link means for movement therewith and arranged so that said torch is moved relative to said work holder in accordance with movement of said link means and said torch assumes and maintains a position relative to said work holder corresponding to the position of said magnetic member relative to said template.

9. The combination of claim 8 wherein said first link means is connected to and movable with second link means about a third axis, said follower member being operative to move said first and second link means about said third pivotal axis in accordance with the configuration of said ferromagnetic template so that said torch is maintained a predetermined distance from said work holder.

10. The combination according to claim 9 including means for rotating said template and said work holder, and control means responsive to the movement of said follower relative to said template to vary the speed of said means for rotating said template so that the speed of said work holder past said torch remains constant.

11. In combination, a work holder and a ferromagnetic template mounted for rotation about a common axis, means for rotating said work holder and said template, a first link rotatable about a second axis, a follower member supported on said first link for contact with said template, a magnetic member having a magnetic axis pivotally supported on said first link means for movement with respect to said first link and said template so that its magnetic axis assumes and maintains a normal position wherein said magnetic axis is perpendicular to a tangent to the surface of said template nearest to said magnetic member, detecting means responsive to movement of the magnetic member relative to the first link, means controlled by the detecting means to rotate the link to return it to a normal position relative to said magnetic member in response to deviation of the magnetic member from a normal position, and a work device positioned adjacent the work holder and carried by said first link so that the position of said work device is corrected as the position of the link is corrected and the work device is maintained in proper position relative to the work holder.

12. The combination of claim 11 including means supporting said follower member for radial movement towards and away from the axis of rotation of said template, and means connecting said torch to and for movement with said follower member so that said torch moves radially relative to said work holder and maintains a predetermined spaced relationship from said work holder.

13. The combination according to claim 12 including means for rotating said template and the work holder, and means sensing radial movement of said follower member and operative in response thereto to control the speed of said last mentioned means so that the speed of said template and said work holder past the follower and the torch remains constant.

References Cited in the file of this patent

UNITED STATES PATENTS

| | | |
|---|---|---|
| 2,017,513 | Shatkin | Oct. 15, 1935 |
| 2,190,360 | Howard | Feb. 13, 1940 |
| 2,499,938 | Ward | Mar. 7, 1950 |
| 2,778,280 | Trofimov | Jan. 22, 1957 |
| 2,927,195 | Arnaud | Mar. 1, 1960 |
| 2,927,992 | Bateman | Mar. 8, 1960 |

UNITED STATES PATENT OFFICE
CERTIFICATE OF CORRECTION

Patent No. 3,124,093                                        March 10, 1964

William M. Wakeley

It is hereby certified that error appears in the above numbered patent requiring correction and that the said Letters Patent should read as corrected below.

Column 4, line 5, for "member, a" read -- member having a --.

Signed and sealed this 21st day of July 1964.

(SEAL)

Attest:

ESTON G. JOHNSON                                 EDWARD J. BRENNER
Attesting Officer                                     Commissioner of Patents